(12) United States Patent
Morlon

(10) Patent No.: US 9,229,299 B1
(45) Date of Patent: Jan. 5, 2016

(54) MULTI-DIRECTIONAL ROTATIONAL MOUNT

(71) Applicant: Jason Y Morlon, San Francisco, CA (US)

(72) Inventor: Jason Y Morlon, San Francisco, CA (US)

(73) Assignee: SWIVIT, INC., San Francisco, CA (US)

( * ) Notice: Subject to any disclaimer, the term of this patent is extended or adjusted under 35 U.S.C. 154(b) by 0 days.

(21) Appl. No.: 14/683,123

(22) Filed: Apr. 9, 2015

Related U.S. Application Data

(60) Provisional application No. 61/977,614, filed on Apr. 9, 2014.

(51) Int. Cl.
  *G03B 17/00* (2006.01)
  *G03B 17/56* (2006.01)
  *G03B 17/08* (2006.01)

(52) U.S. Cl.
  CPC .............. *G03B 17/561* (2013.01); *G03B 17/08* (2013.01)

(58) Field of Classification Search
  USPC .......... 396/419–423, 427, 428; 348/373–376; 16/282, 302
  See application file for complete search history.

(56) References Cited

U.S. PATENT DOCUMENTS

| | | | | |
|---|---|---|---|---|
| 4,945,367 | A * | 7/1990 | Blackshear | G08B 13/19619 348/143 |
| 6,894,724 | B2 * | 5/2005 | Patel | G08B 13/19619 348/143 |
| 2004/0159754 | A1 * | 8/2004 | Ku | 248/183.1 |

* cited by examiner

*Primary Examiner* — Minh Phan
(74) *Attorney, Agent, or Firm* — Staniford Tomita LLP

(57) ABSTRACT

A multidirectional camera mount allows quick, easy and safe rotational adjustment of camera orientation and/or position. An upper side of the multidirectional camera mount can include upper mounting tabs attached to a camera, camera housing or other device. A lower side of the multidirectional camera mount can include lower mounting tabs which can be affixed to various objects, while static or during numerous physical activities. The multidirectional camera mount can allow the upper mounting tabs to rotate relative to the lower mounting tabs.

9 Claims, 15 Drawing Sheets

MULTI-DIRECTIONAL ROTATIONAL MOUNT

CROSS-REFERENCE TO RELATED APPLICATIONS

This application claims priority to U.S. Provisional Application No. 61/977,614, "Multidirectional Camera Mount Allowing Quick, Easy And Safe Adjustment Of Camera Direction To Film More Of The Environment Around The Camera And User" filed on Apr. 9, 2014, which is hereby incorporated by reference in its entirety.

TECHNICAL FIELD

The disclosed invention can be used in the technical field of still camera and video camera mounting systems. More specifically, the disclosed invention can be used with still cameras and video cameras mounting systems having improved functionality with rotational capabilities to various positions.

BACKGROUND

Many individuals have found it desirable to record their activities, hobbies, events, and film productions. Conventionally, cameras are mounted in a fixed position, allowing only a certain field of view of any one direction at a time. Problems with many conventional camera mount systems is that they leave the camera locked/facing one direction with no simplified method for changing the camera angle/direction to obtain different angles of footage. Many camera mount systems have locking mechanisms, thumb screws, ball joints and other components that must be adjusted or manipulated with two hands to alter the camera orientation. In order to change the camera angle, the user must loosen the locking mechanisms, readjusting the camera angle and then tightening the locking mechanisms.

Some mount systems provide a mounting point that leaves the camera facing n degrees from where the camera is intended, which means having to use extra parts or components to obtain the correct camera angle/direction, in relation to how it is being mounted/affixed. Under various operating conditions this is cumbersome, time consuming, and sometimes even unsafe. Though many mounts are functional with commercial success, there has been a long standing need for improvement.

SUMMARY OF THE INVENTION

The disclosed invention is a multidirectional positioning device. In preferred embodiments, the positioning device is used with camera mounts to change a directional position of a camera. The ability to change the direction of the camera allows a user to obtain more angles of photographic footage in the moment of current activity quickly, easily, safely, single-handed without changing the physical connection to a mounted structure.

Previous means of changing the direction of a camera to different angles of footage required a complex adjustment of connectors and/or mounting mechanisms. This required time and effort to adjust, manipulate, reposition, re-align existing mounting systems/elements and possibly sacrificing safety to change the camera direction. The disclosed invention functions to establish a simple, safe way to operate under conditions that would normally be unobtainable in many situations for reasons stated in the background above.

The disclosed invention allows a simple addition to existing mount and camera setups that allows a full 360 degrees of rotation, in either a clockwise or counter-clockwise direction, with a plurality of index positions, of n degrees between the index positions that allowing much more positional versatility and functionality. This multidirectional camera mount also allows a user to change the position of the camera without the use of two hands, thumb screws, locking/unlocking mechanisms, or any other form of position control.

In an embodiment, the camera mount can include a housing that can be attached to camera mounting tabs, a rotational member that can be attached to a mounting base and an index mechanism that is coupled to the rotational member and slides against a portion of the housing. The index mechanism provides rotational resistance and a plurality of index positions that can hold a camera in a plurality of rotational positions.

A mounting base of some form is affixed to a surface, part, or component of virtually any object. For example, the base can be any vehicle, sporting device such as: a surfboard, bicycle, etc., rigging, camera mount systems, tripods, tables, helmets, etc. A camera will be affixed/mounted to the top of the disclosed invention. In an embodiment, the camera can be placed in a mechanism such as a housing that has mounting tabs which can engage a first set of mounting tabs on the inventive camera mount. Similarly, the inventive camera mount can have a second set of mounting tabs which can engage mounting tabs coupled to an object that the camera will be connected such as: a surfboard, paddleboard, windsurfer, kite board, boat, bicycle, automobile, motorcycle, rigging, camera mount systems, tripods, tables, helmets, etc.

Thus, the inventive system can be used in a configuration where the multidirectional camera mount can be coupled base on one side and a camera on the opposite side. The multidirectional mount will allow the rotation of the camera in a full 360 degrees, with n degrees of separation between specified stopping positions to allow for set angles of capturing footage in a more uniquely dynamic way, due to the ability to operate the disclosed invention and most importantly the camera without having to manipulate, adjust or change any other parts or components, while any activity is happening, such as surfing, bicycling, or riding a motorcycle.

DETAILED DESCRIPTION OF THE INVENTION

Figure 1:
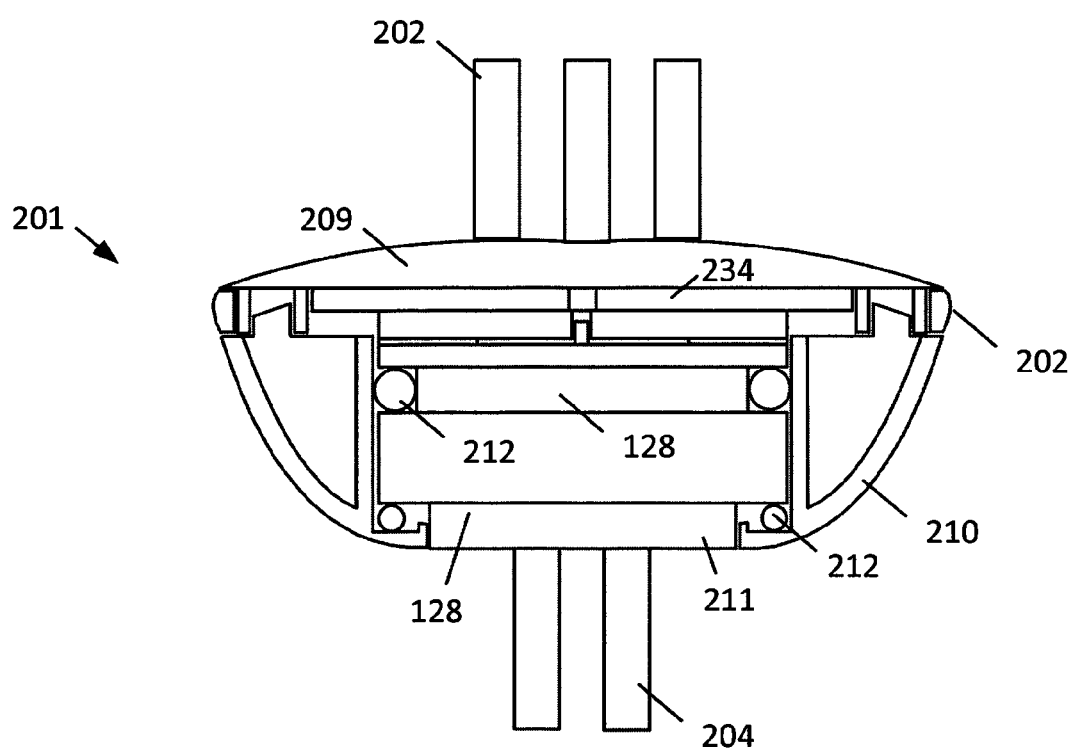
FIG. 1 is a cross section side view of an embodiment of a multi-directional mount.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. For example, the inventive multidirectional mount can be used with ¼" universal threaded adapters used on most cameras, tripods and the quick release mount. Also, it is to be understood that the phraseology and terminology employed herein are for the purpose of description and should not be regarded as limiting.

Figure 2:
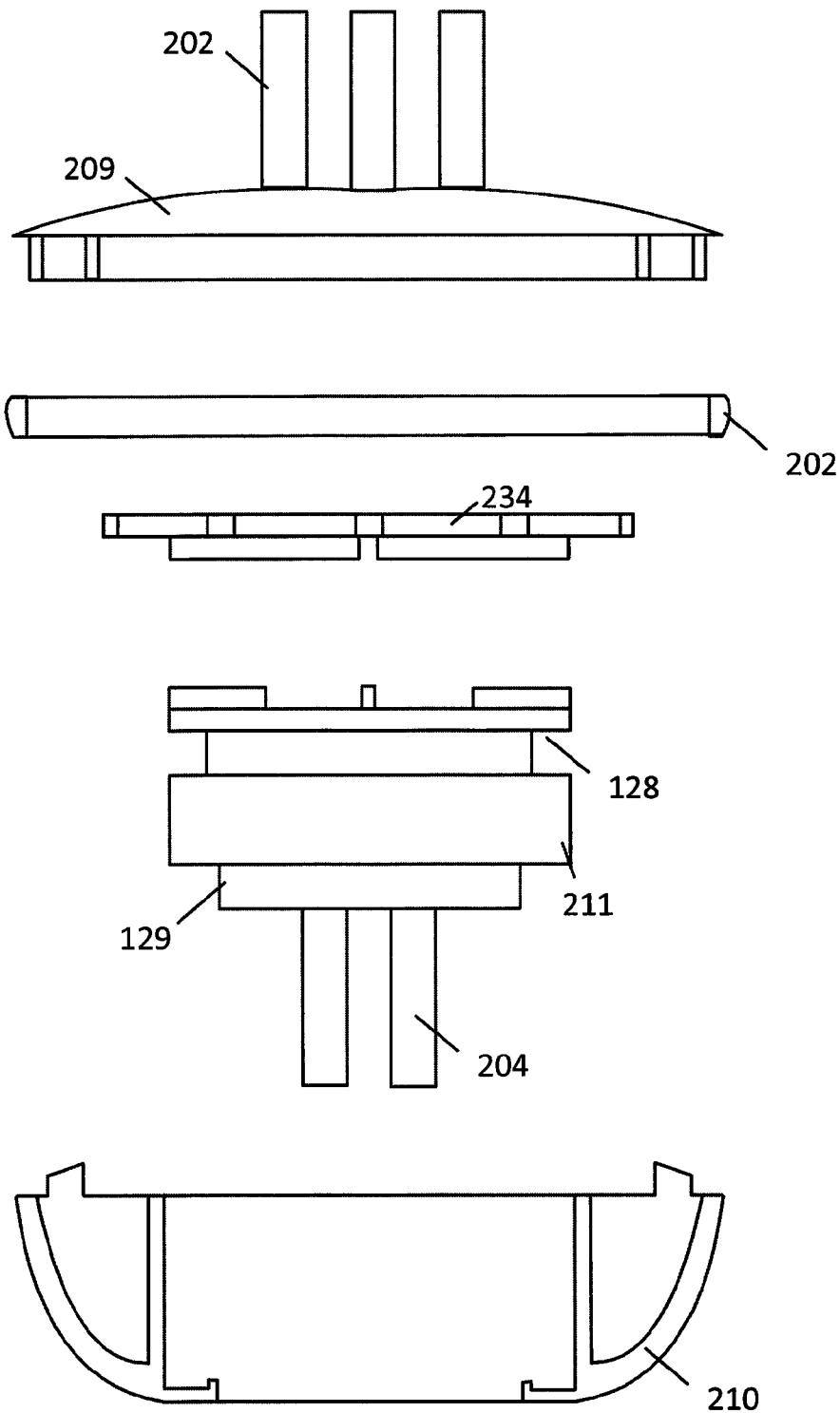
FIG. 2 is an exploded side view of an embodiment of a multi-directional mount.

An embodiment of the present invention is illustrated in the FIGS. 1 and 2. FIG. 1 illustrates a cross sectional view of an embodiment of a multidirectional rotational mount 201 and FIG. 2 illustrates an exploded view of an embodiment of a multidirectional rotational mount. In the illustrated embodiment, the housing has an upper body 209 and a lower body 210 that can be rigidly locked and/or fastened together to surround the internal rotation mount components that form the rotational mount assembly 201. In different embodiments, the upper body 209 and a lower body 210 that can be fused together with adhesives, welding, screws, threads, or any other suitable connection mechanism(s). An ornamental ring 214 can be placed in a groove in the outer diameter of the rotational mount 201 between the upper body 209 and the lower body 210. In an embodiment the ornamental ring 214 can be made of an elastic material that can be any color an imprinted with any designs or text. Upper mounting tabs 202 can be rigidly coupled to the upper body 209. The upper body 209 and 208 can surround the rotational member and allow rotation of the rotational member. Lower mounting tabs 204 can extend from the rotational member 211 of the rotation mount 201.

The rotational member 211 can be attached to an index member 234 and the index member 234 can rotate with the rotational member within the rotational mount 201. The index member 234 can be made of an elastic material that can bend or deform elastically without causing any structural damage or plastic deformation to the rotational member 211.

The rotational member 211 can include a first circular portion that rotates within a first cylindrical portion of the lower body 210. The rotational member 211 can be coupled to the index member 234 that rotates within a second cylindrical portion of the upper body 209. The first circular portion of the rotational member 211 can be slightly smaller in diameter than the first cylindrical portion of the lower body 210 and the second circular portion of the index member 234 can be slightly smaller than the second cylindrical portion of the upper body 209.

The rotational member 211 can also be sealed in a watertight manner with the rotational 101. Elastomer O-rings 212 can fit into grooves in the rotational member 211 and the O-rings 212 can slide against cylindrical surfaces in lower body 110 and the upper body 209. The O-rings 212 can also provide a fluid seal to prevent contaminants from entering the housing, contacting the internal rotation mount components and interfering with the rotation of the rotating member 211 and the index member 234.

Figure 3:
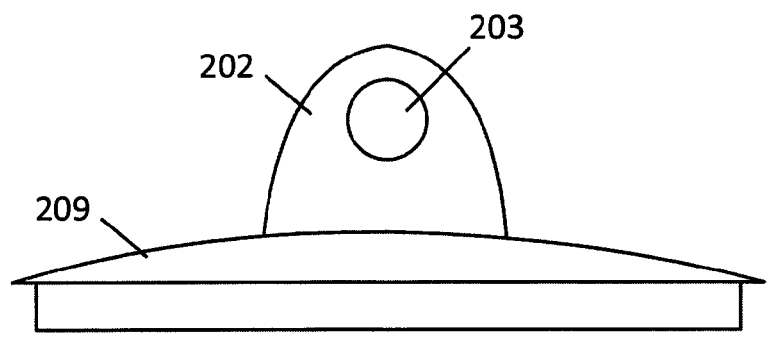
FIG. 3 is a side view of an upper body of an embodiment of a multi-directional mount.

FIG. 3 illustrates a side view of an embodiment of the upper body 209. The upper body 209 is rigidly coupled to the upper mounting tabs 202. The upper mounting tabs 202 can have mounting holes 203. The outer diameter can extend beyond a cylindrical outer diameter. This recessed area fit within an inner diameter on an upper surface of the lower body can accommodate an ornamental ring shown in FIGS. 1 and 2.

Figure 4:
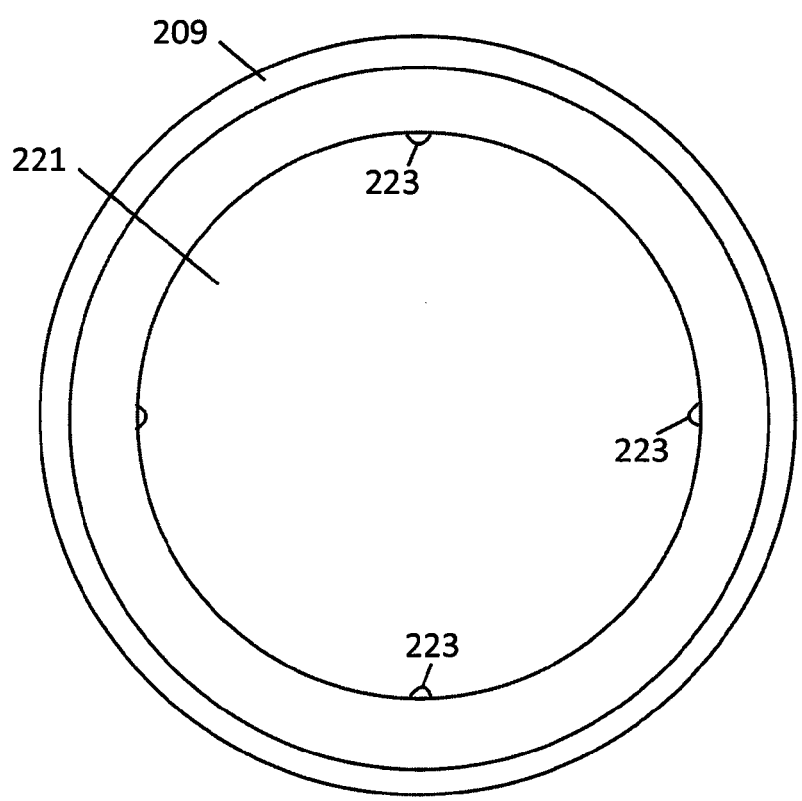
FIG. 4 is a bottom view of an upper body of an embodiment of a multi-directional mount.

FIG. 4 illustrates a bottom view of an embodiment of the upper body 209. In this embodiment the upper body 209 include a cylindrical recessed volume 221 that has a plurality of index features 223. In the illustrated example, there are four index features 223 that protrude inward. The index features can have a rounded surface with an apex that extends about 0.001 inch-0.100 inch inward from the cylindrical surface of the recessed volume 221 and can be about 0.100-0.200 inch wide. The depth of the cylindrical recessed volume 221 can be about 0.2-0.5 inches.

Figure 5:
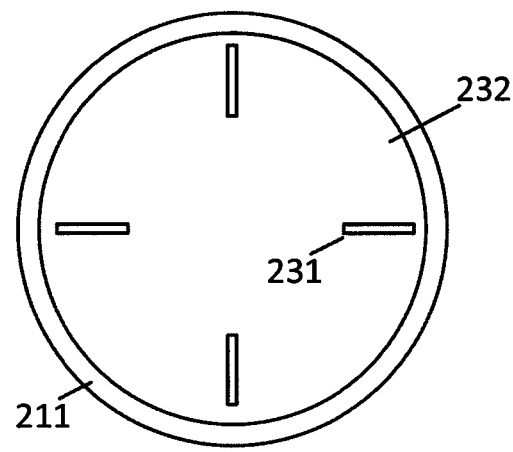
FIG. 5 is a top view of a rotational member of an embodiment of a multi-directional mount.
Figure 6:
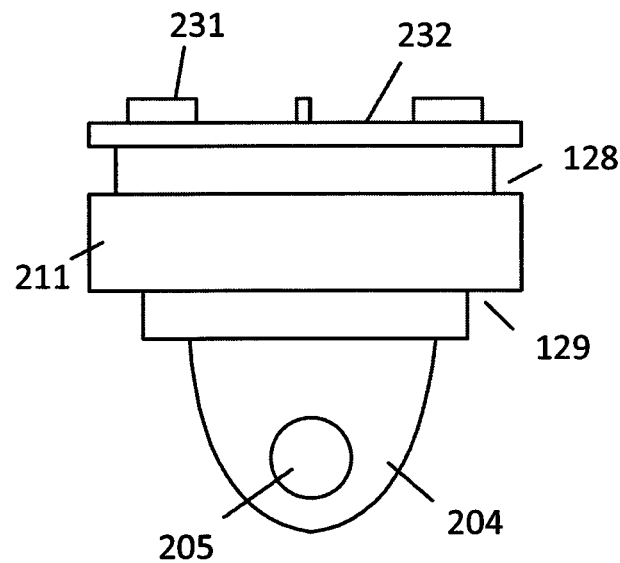
FIG. 6 is a side view of a rotational member of an embodiment of a multi-directional mount.

FIG. 5 illustrates a top view of an embodiment of the rotation member 211 which can have a cylindrical outer surface and a planar upper surface 232. In the illustrated embodiment, there are four rectangular cross section bars 231 that extend upward from the planar upper surface 232. FIG. 6 illustrates a side view of an embodiment of a rotational member 211. The lower mounting tabs 204 extend from the lower portion of the rotational member 211. The lower mounting tabs 204 can have mounting holes 205. The rotational member 211 can also include an O-ring groove 128 and a lower O-ring recess 129 in the side of the rotational member 211.

Figure 7:
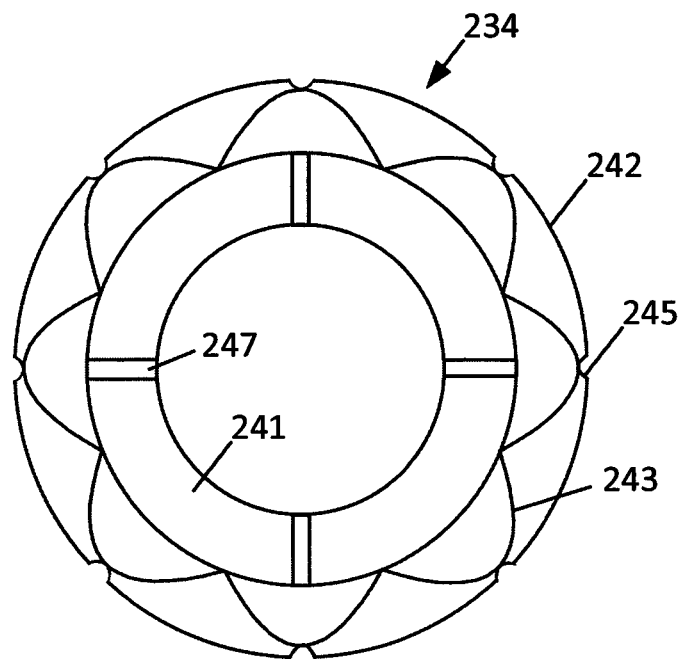
FIG. 7 is a bottom view of an index member of an embodiment of a multi-directional mount.

FIG. 7 illustrates a bottom view of an embodiment of the index ring 234 that can have a cylindrical center 241 and a hollow outer portion that includes an outer ring 242 and a plurality of connectors 243 that are coupled to both the cylindrical center 241 and the outer ring 243. The cylindrical center 241 can be a solid disk or an open annular structure as shown. Open spaces can exist between the cylindrical center 241 and the plurality of connectors 243 and between the plurality of connectors 243 and the outer ring 242. In the illustrated embodiment, the plurality of connectors 243 can be arc shaped with the beginning and ends of the arcs contacting the cylindrical center 241 and the apexes contacting the inner diameter of the outer ring 242. In other embodiments, the connectors 243 can have any other shape or configuration. In the illustrated embodiment, four recessed index features 245 are formed at equal quadrants of the in the outer ring 243. In other embodiments, any number of index features 245 can be formed on the outer ring 242 and the index features 245 can be recesses or protrusions or any other form.

The plurality of connectors 243 and the outer diameter ring 242 can have a thickness (distance between the top and bottom surfaces) that is greater than the width of these features. For example, in an embodiment, the width can be between about 0.005-0.050 inch and thickness can be about 0.050-0.400 inch. The material used to make the index ring 211 can be elastic so that the outer ring 242 can deform with elastic deformation and return to its original shape rather than plastic deformation.

Figure 8:
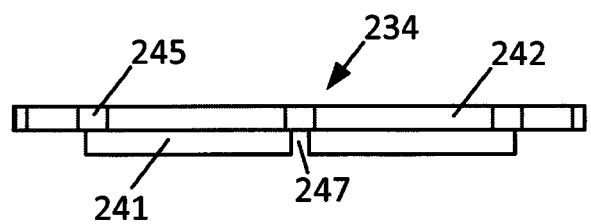
FIG. 8 is a side view of an index member of an embodiment of a multi-directional mount.

With reference to FIG. 8 a side view of the index ring 234 is illustrated. The upper and lower surface of the index ring 234 can be planar. The cylindrical center 241 is thicker than the plurality of arcs 243 and the outer diameter ring 242. Slots 247 can be formed in the cylindrical center 241 that are radially configured across cylindrical center 241. In the illustrated embodiment, there are four slots 247 formed in the index ring 234 that are each separated by 90 degrees in angular orientation. In other embodiments, any other type of coupling between the rotating member 211 and the index ring 234 can be used that allows torque to be transmitted from the rotational member 211 to the index ring 234. For example, any number of slots 247 can be formed in the index ring 234. In yet another embodiment, the rotational member 211 and the index ring 234 can be fabricated together as a single component.

Figure 9:
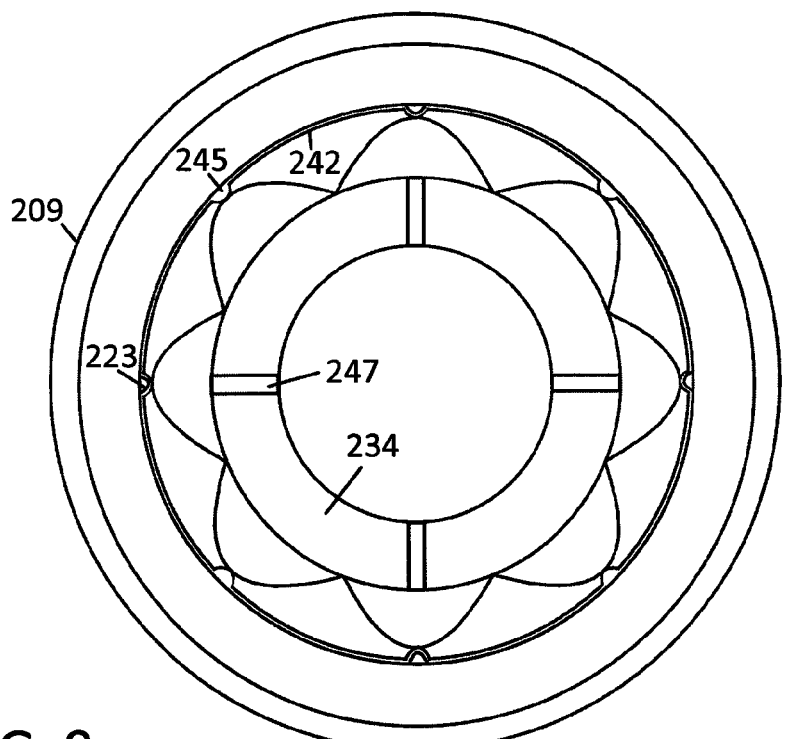
FIG. 9 illustrates an index member in an index position in an embodiment of a multi-directional mount.
Figure 10:
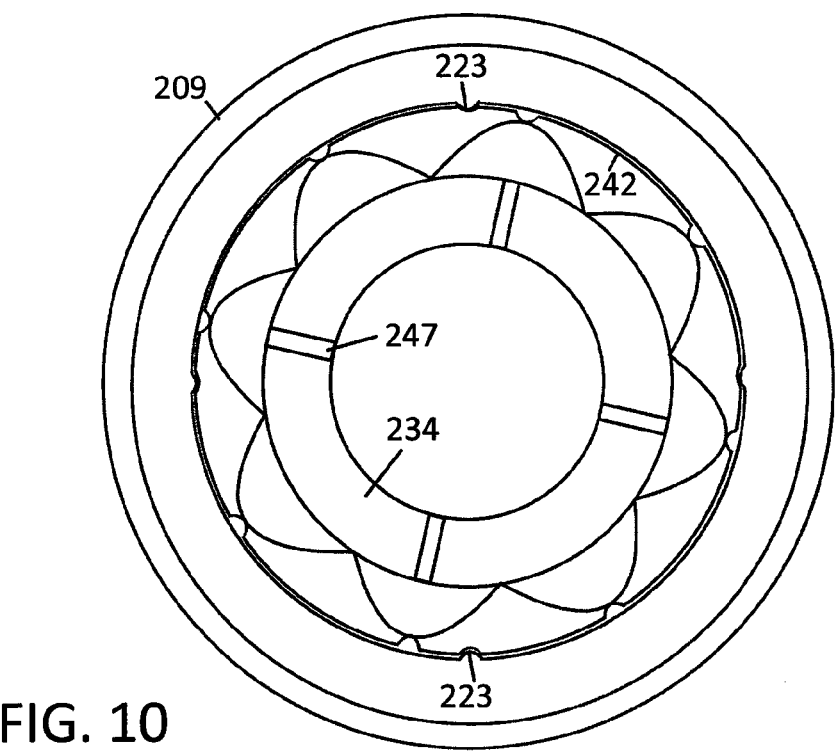
FIG. 10 illustrates an index member moving between index positions in an embodiment of a multi-directional mount.

When the rotational mount 201 is assembled and the rotational member 211 can rotated within the lower body 210 and the index member 234 rotates relative to the upper body 209. With reference to FIGS. 9 and 10, the index member 234 can have index features 245 that can slide against the second cylindrical portion 251 of the upper body 209. In the illustrated embodiment, the outer ring 242 of the index member 234 has eight rounded indentations 245 that can engage four protrusions 223 that extend inward from the second cylindrical portion 251 of the upper body 209. The protrusions 223 can be arranged at angular positions: 0°-90°-180°-270°. The indentations 245 can be aligned with the slots extending from the rotating member. The indentations can be arranged at angular positions: 0°-45°-90°-135°-180°-225°-270°-315°.

With reference to FIG. 10, when the index member 211 is rotated, the protrusions 223 in the inner diameter 251 can slide along the outer diameter of the outer ring 242. The outer ring 242 can be deformed inward by the protrusions 223 in the inner diameter 251. As the index member 211 rotates, the protrusions 223 slide about the outer circular member 232 and move towards the adjacent indentations 245 to the circular outer ring 242 of the index member 234. When the index member is rotated 45°, the group of four protrusions 223 can move into the next group of four indentations 245 in the index member 234 as shown in FIG. 9.

The indentations 245 can be substantially the same size as or slightly larger than the corresponding protrusions 223 so that when the protrusions 223 are positioned within the indentations 245, there is little or no movement between the protrusions and the indentations. There is also additional resistance rotational movement because the protrusions 223 must deform the outer ring 242 inward in order to cause the index member 234 to rotate. In this example, the arcuate members 243 can be compressed when the protrusions 223 are not in the indentations 245 but the arcuate members 243 can be uncompressed when the protrusions 223 are within the indentations 245. For example, the rotational torque required to move the rotational member 211 from an index position can be more than about 3-6 foot-pound of torque. In contrast, the torque required to move the rotational member 211 when the protrusions 223 are not in the indentations 245, can be less than about 0.5-2.0 foot-pound of torque. Thus, toque required to move the rotational member 211 from an index position can be 2 time or more greater than the torque required to move the rotational member 211 when it is not in an index position. The multidirectional camera mount 201 can hold the camera in an index position when exposed to most ambient conditions. Examples of index angles for the multidirectional camera mount are illustrated in Table 1 below.

TABLE 1

| Number of index positions | Angles of index positions |
| --- | --- |
| 4 | 0° - 90° - 180° - 270° |
| 6 | 0° - 60° - 120° - 180° - 240° - 300° |
| 8 | 0° - 45° - 90° - 135° - 180° - 225° - 270° - 315° |
| 12 | 0° - 30° - 60° - 90° - 120° - 150° - 180° - 210° - 240° - 270° - 300° |

In other embodiments, the multidirectional camera mount can be configured with any other number of index positions. In these different embodiments, there can be various numbers of indentations 234 in the outer circular member 232 of the index member 211 and various numbers of protrusions 223 from the inner diameter of the second cylindrical portion 251 of the upper body 209. However, in preferred embodiments, the indentations 234 and protrusions 251 are configured at equal angular displacements around the circumference of the circular member 232 and the inner diameter of the second cylindrical portions 251.

Figure 11:
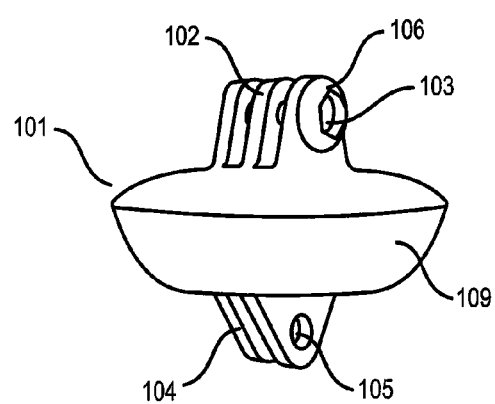
FIG. 11 is a three-quarter perspective view of an embodiment of a multi-directional mount.
Figure 12:
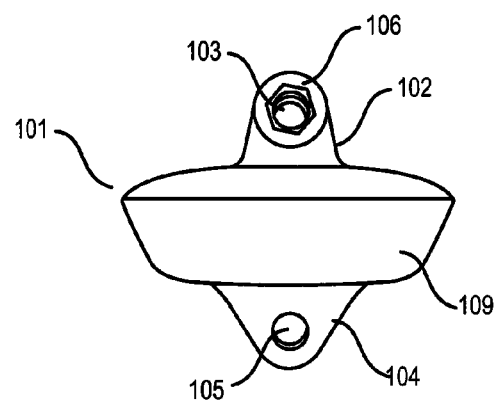
FIG. 12 is a side view of an embodiment of a multi-directional mount.
Figure 13:
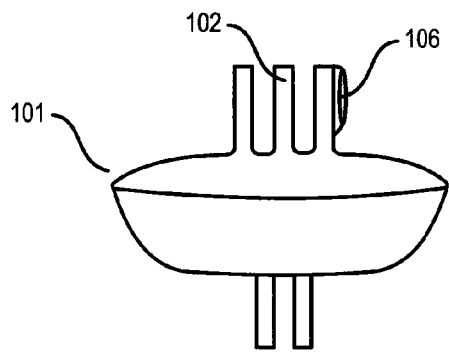
FIG. 13 is a front/rear view of an embodiment of a multi-directional mount.
Figure 14:
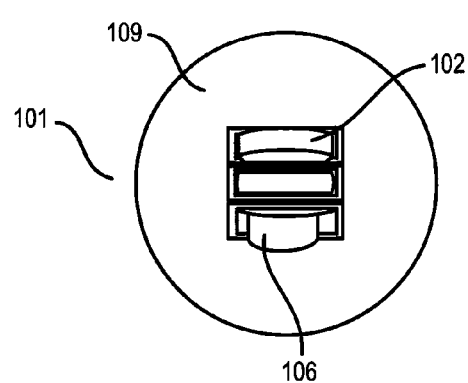
FIG. 14 is a top view of an embodiment of a multi-directional mount.

The multi-directional mount can have various external features. FIGS. 11, 12, 13, and 14 illustrates multiple views of one embodiment of the present invention. FIG. 11 illustrates a three quarter view of the multi-directional mount 101, FIG. 12 illustrates a side view of the multi-directional mount 101, FIG. 13 illustrates a front or rear view of the multi-directional mount 101 and FIG. 14 illustrates a top view of the multi-directional mount 101. The upper mounting tabs 102 can extend vertically upward from the outer body 109 of the multi-directional mount 101 and the mounting tabs 102 can be coupled to a camera. In the illustrated embodiment there are three upper mounting tabs 102. Each of the upper mounting tabs 102 can have a mounting hole 103 and one of the end tabs can have a reinforced portion 106 that surrounds the mounting hole 103. The bottom half of the multi-directional mount 101 has lower mounting tabs 105 that extend downward from the rotational member. In the illustrated embodiment, there are two lower mounting tabs 104 and a mounting hole 105 that extends through both lower mounting tabs 104.

Figure 23A:
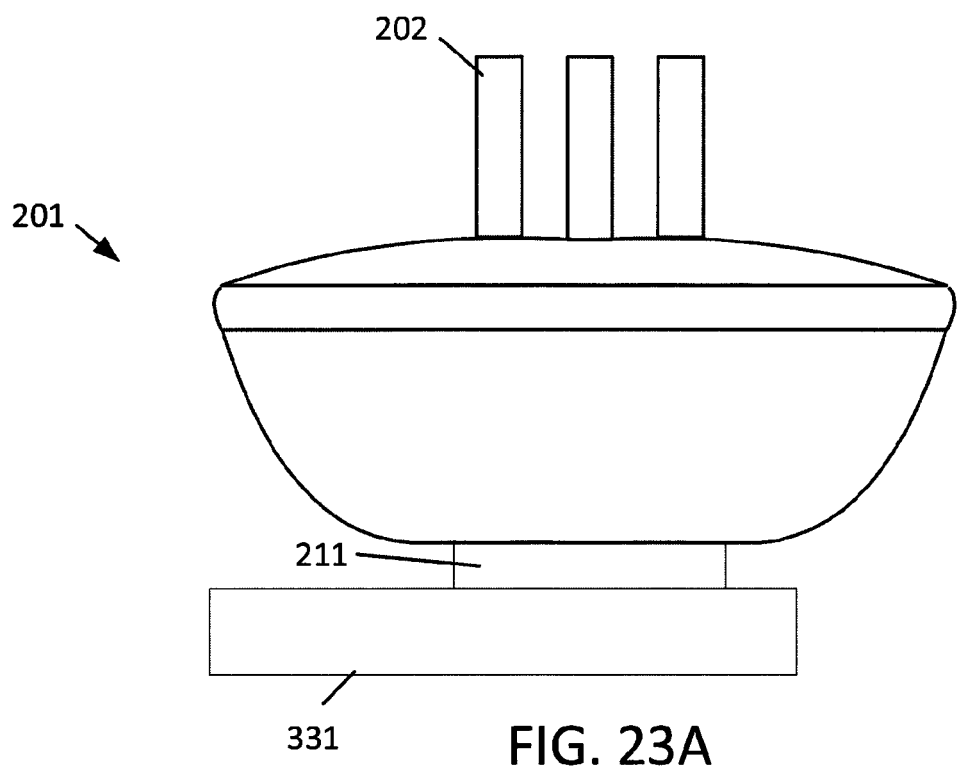
FIGS. 23A-23F illustrate various connector mechanisms that can be used with the multi-directional mount.
Figure 23B:
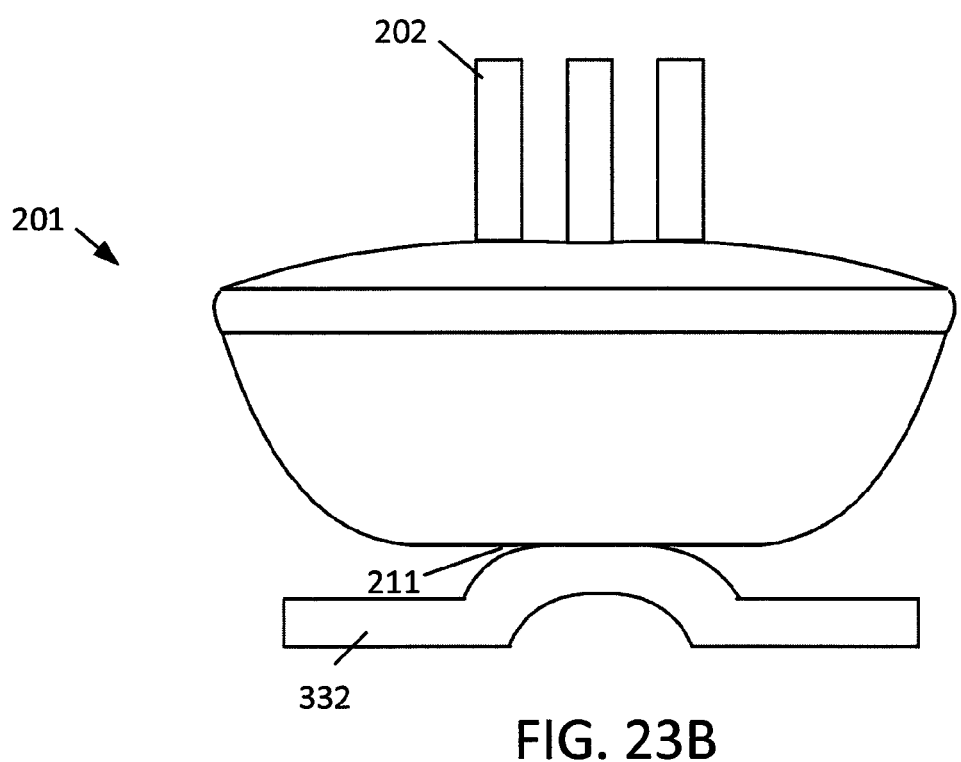
Figure 23C:
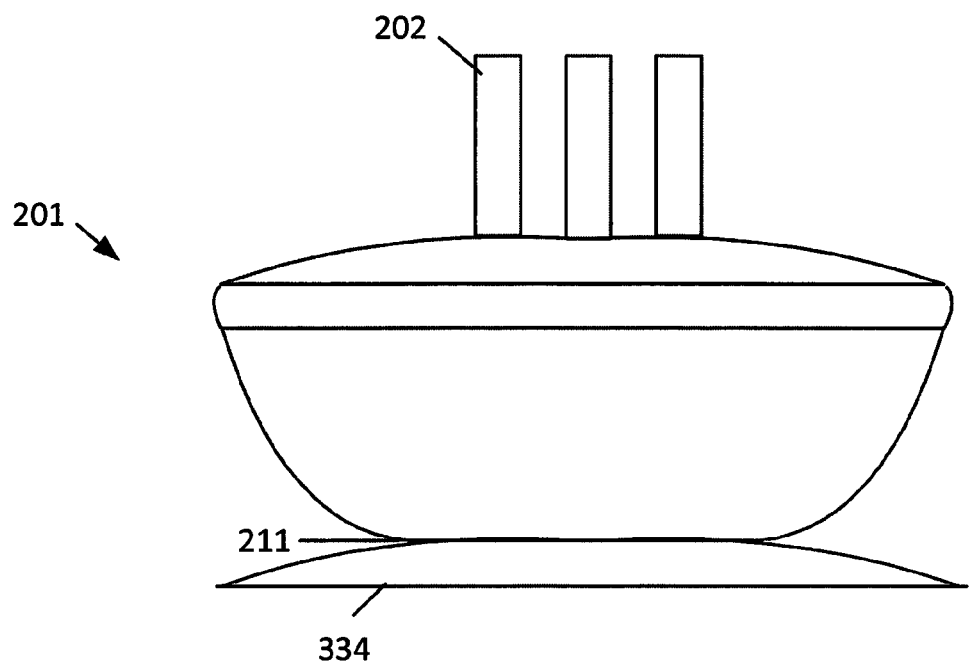
Figure 23D:
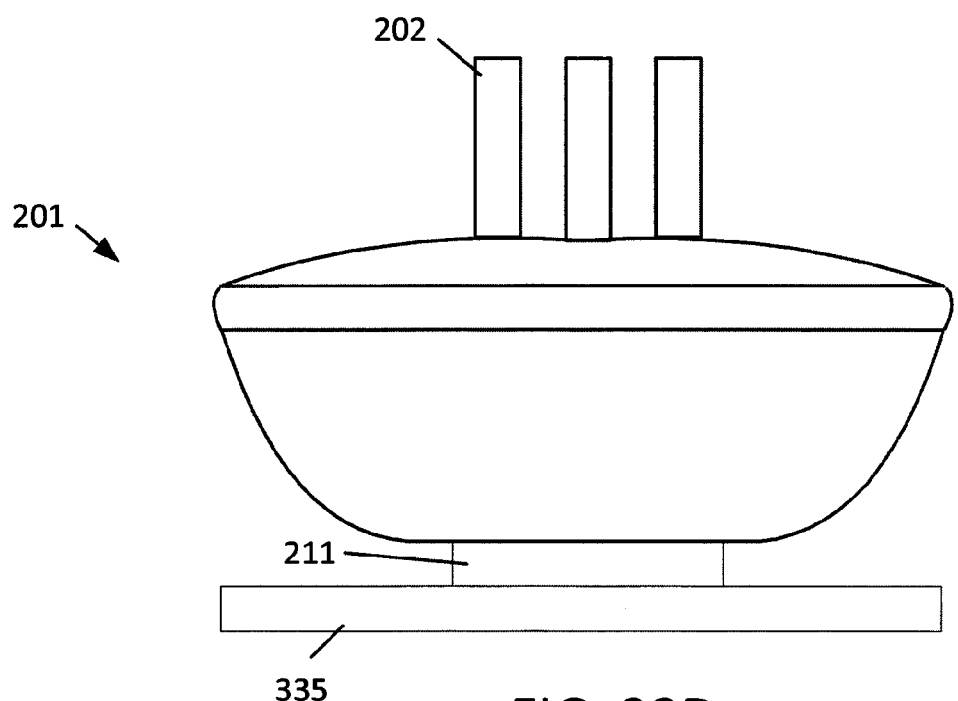
Figure 23E:
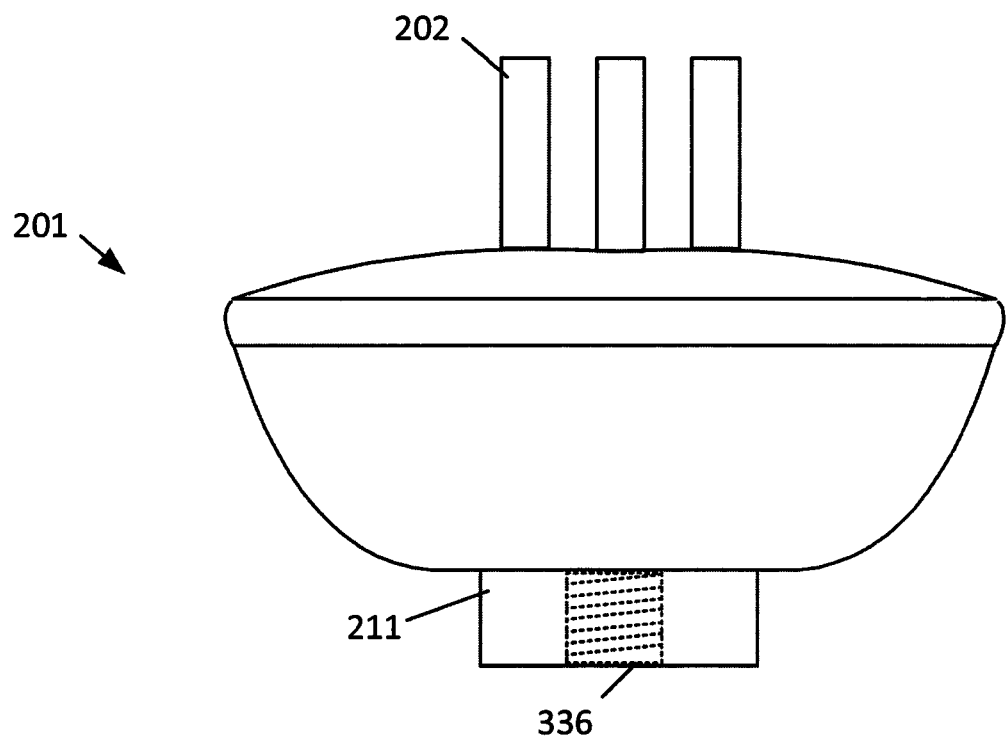
Figure 23F:
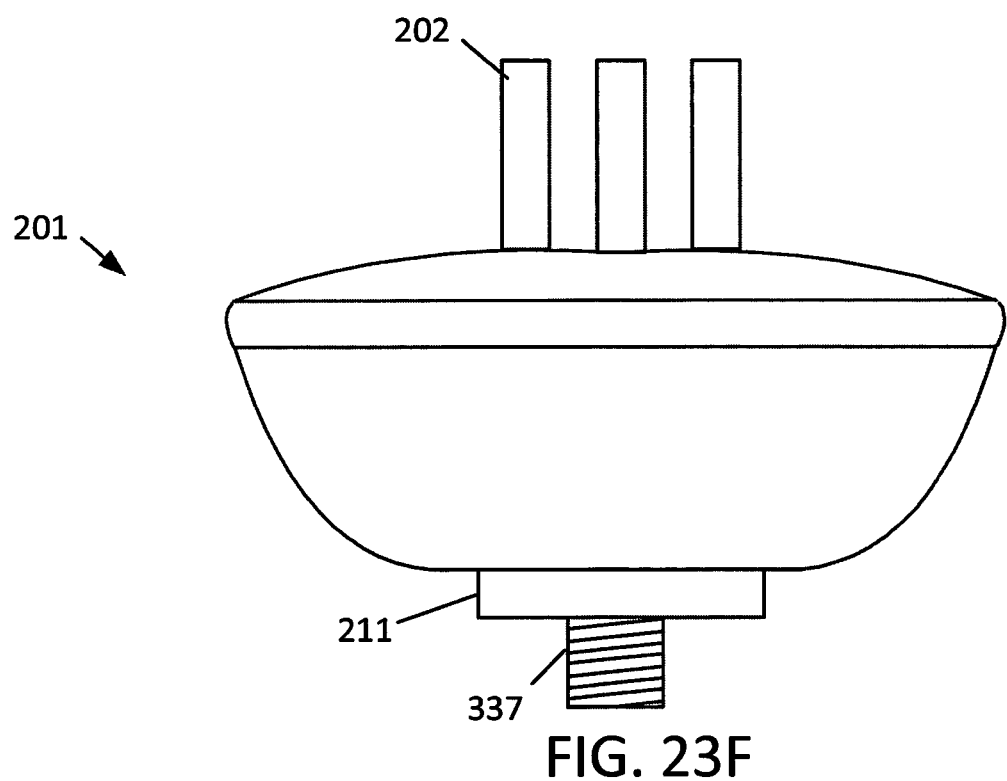

In other embodiments, the rotational member 211 portion of the multi-directional mount 101 can be coupled to various types of connection mechanisms that can replace the lower mounting tabs 104. For example, with reference to FIG. 23A, the rotational member 211 can be coupled to a quick connect coupling 331 that can fit with a standardized mount connector. With reference to FIG. 23B, the rotational member 211 can be coupled to a bracket 332 that can be secured to a horizontal bar or any other structure. With reference to FIG. 23C, the rotational member 211 can be coupled to a concave adhesive mount 334 that can be secured to a convex surface such as a helmet. With reference to FIG. 23D, the rotational member 211 can be coupled to a planar adhesive mount 335 that can be secured to any flat surface. With reference to FIG. 23E, the rotational member 211 can be coupled to a female threaded connector 336 such as a ¼" internal thread. With reference to FIG. 23F, the rotational member 211 can be coupled to a male threaded connector 337 such as a ¼" external threaded bolt. In other embodiments, various other types of connectors can be used with the multi-directional mount 101.

Figure 15:
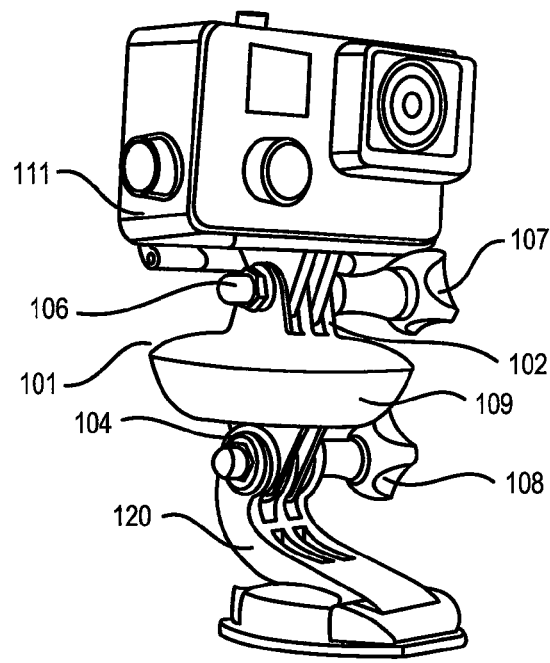
FIG. 15 is a perspective view of an embodiment of a multi-directional mount attached to a camera and a universal base mount.

The inventive multi-directional mount 101 can be used with various camera mounting component combinations. With reference to FIG. 15, the multi-directional mount 101 is coupled between a camera 111 and a J hook quick release buckle 120 that is attached to a flat adhesive mount attached to a planar surface. The camera 111 is attached to the multi-directional mount 101 with a nut 106 and a bolt/thumb knob 107. The angular position of the camera 111 can be adjusted by loosening the bolt/thumb knob 107, adjusting the camera 111 to the desired position and then tightening the bolt/thumb knob 107. Similarly, the multi-directional mount 101 is attached to the J hook quick release buckle 120 with a nut and a bolt/thumb knob 108. The angle of the multi-directional mount 101 relative to the planar surface can be adjusted by loosening and tightening the bolt/thumb knob 108. In the illustrated embodiment, the multi-directional mount 101 is vertically aligned with the planar surface and the camera. Thus the camera 111 and upper portion of the multi-directional mount 101 can rotate in a plane that is substantially parallel to the mounting plane.

Figure 16:
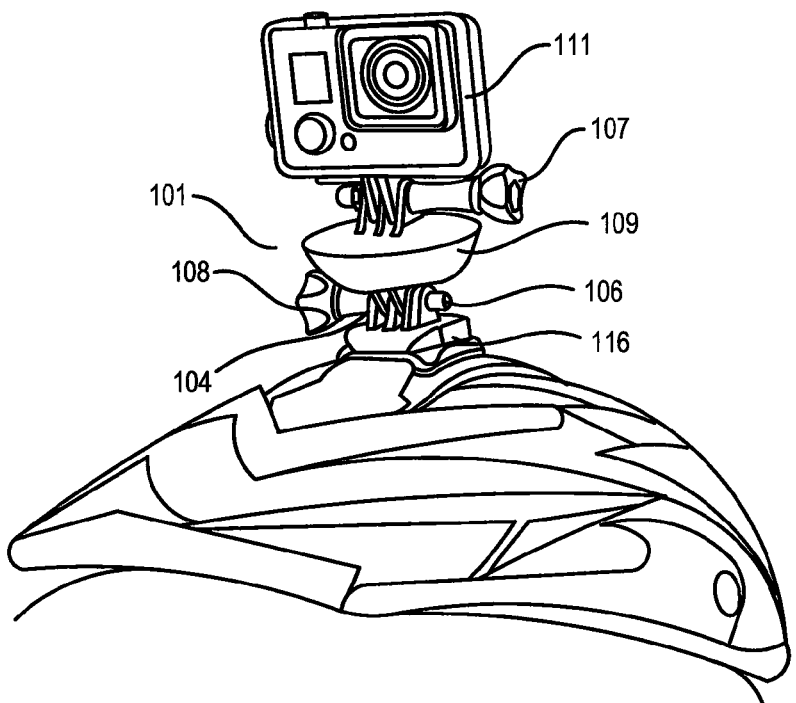
FIG. 16 is a perspective view of an embodiment of a multi-directional mount attached to a camera and a helmet.

With reference to FIG. 16, another embodiment of a multi-directional mount 101 used with a camera 111 is illustrated. In this example, the multi-directional mount 101 is coupled between a camera 111 and a horizontal surface quick release buckle 116 that is attached to a curved adhesive mount attached to a curved surface of a helmet. The camera 111 is attached to the multi-directional mount 101 and the angular connection is adjusted with a nut and a bolt/thumb knob 107. The multi-directional mount 101 is attached to the horizontal surface quick release buckle 116 with a nut and a bolt/thumb knob 108. In the illustrated example, the multi-directional mount 101 and the camera 111 are angled downward relative to the helmet. Thus, when the camera 111 and upper portion of the multi-directional mount 101 can rotate in a plane that is not parallel to the helmet. The camera 111 can be angled down when facing forward and tilted at angle when rotated to the sides of the helmet and angled up when the camera 111 is facing back. In other embodiments, the multi-directional mount 101 can be assembled with any combination or configuration of connectors, mounts and cameras.

Figure 18:
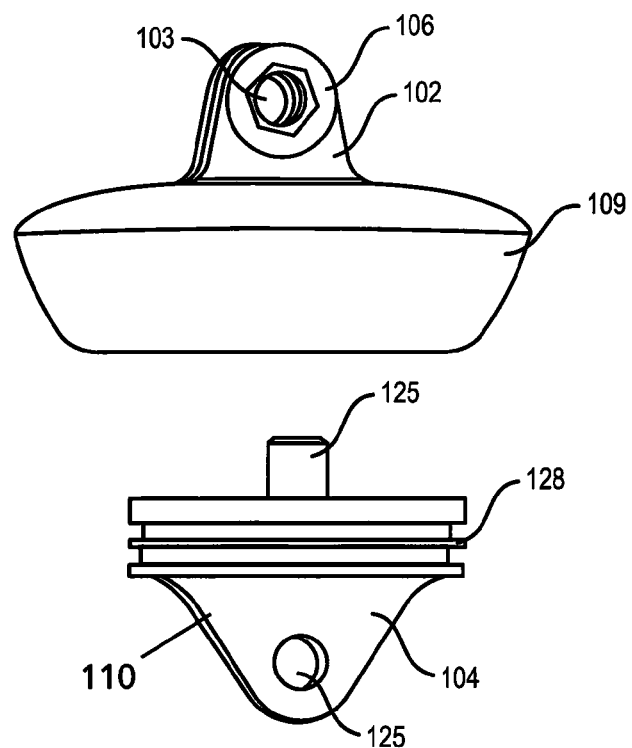
FIG. 18 is an exploded view showing an embodiment of a multi-directional mount.
Figure 19:
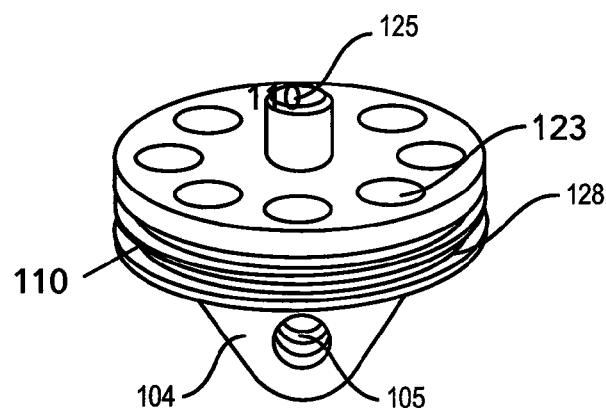
FIG. 19 is a perspective view of an embodiment of a rotational member.
Figure 20:
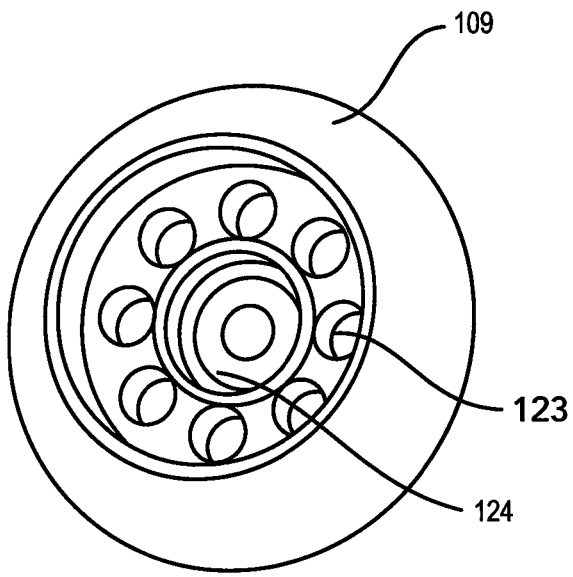
FIG. 20 is a perspective view of a body.
Figure 21:
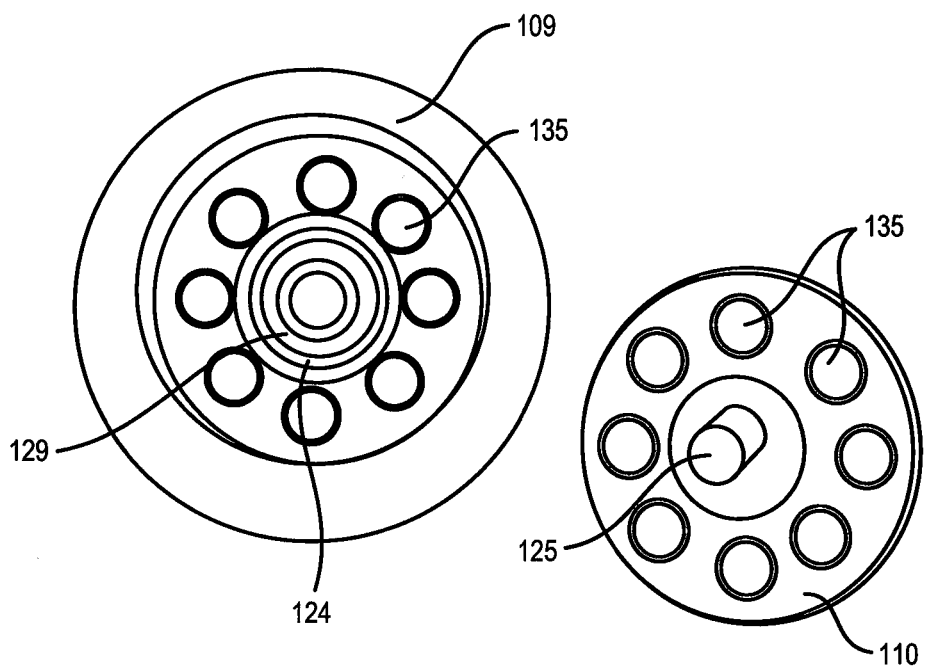
FIG. 21 is a bottom view of a body and a top view of a rotational member of an embodiment of a multi-directional mount.
Figure 22A:
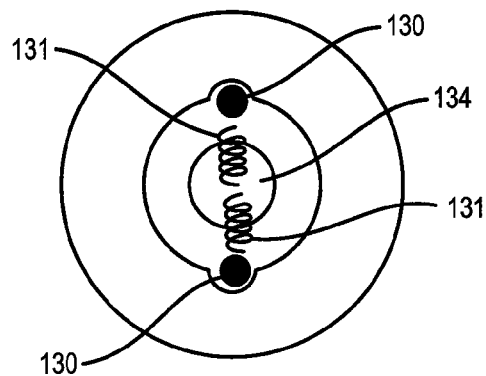
FIGS. 22A-22C are drawings showing the rotational capabilities of the multi-directional mount, showing different angles of rotation.

With reference to FIGS. 18-19 and 22, in an embodiment, the indexing feature of the multi-directional mount 101 can be based upon magnetic attraction. FIG. 18 illustrates an exploded view of the upper body 109 with upper tabs 102 extending from the body 109. The rotational member 110 has a rotational rod 125 extending upward and lower extending tabs 104 and through holes 105 in the tabs 104. The circumference of the rotational member 110 can have one or more grooves 128 that can be used to hold O-rings for sealing the internal components from water and other debris contaminants. FIG. 19 illustrates a perspective view of the rotational member 110. The upper surface of the rotational member 110 can include a plurality of bores 123 that can hold magnets. FIG. 20 illustrates a bottom perspective view of the body 109 which has a center hole 124. In the assembled state, the rotational rod 125 of the rotational member 128 is positioned within the center hole 124 and allow rotational member to rotate smoothly within the body 109. The body also includes a plurality of bores 123 that can hold magnets. With reference to FIG. 21, a bottom view of the body 109 is illustrated with a bearing 129 mounted in the center hole 124 and magnets 135 mounted in the bores around the center hole 124. The top of the rotational member 110 is also illustrated. Magnets 135 are mounted in bores around the rotational rod 125.

The magnets 35 can be cylindrical in shape with two planar surfaces and a cylindrical surface. One of the planar surfaces can have positive polarity and the opposite planar surface can have a negative polarity. Opposite polarities of different adjacent magnets will be attached to each other while, the same polarity of different magnets will repel each other. In an embodiment, the magnets 125 in the body 109 can be aligned with the magnets 125 in the rotational member 110 and configured with opposite polarities so that the magnets 125 in the body 109 can be attracted to the magnets 125 in the rotational member 110. This attractive force can hold the rotational member 110 in a fixed rotational position relative to the body 109. In the illustrated embodiment, there are eight magnets 125 in both the body 109 and the rotational member 110. Thus, the rotational member 110 can rotate and be held in eight different rotational positions that can be about 45 degrees apart in angular increments.

In other embodiments, other types of indexing mechanisms can be used to control the rotation of the rotational member. For example, with reference to FIG. 22A, an index member 134 can include a plurality of spring loaded members 131 that can releasably engage recesses 130 in an inner diameter formed in the body of the multi-directional mount 101. The rotational member can be held stationary relative to the body 109 when the spring loaded members 131 are within the recesses 130. However, when the rotational member rotates, the spring loaded members 131 are moved out of the recesses 130 and rotated 180 degrees until the spring loaded members 131 enter the opposite recesses 130. In the illustrated embodiment there are only two spring loaded members 131 and two recesses 130. However, in other embodiments, there can be any number of spring loaded members 131 and recesses 130 at any angular intervals so that the multi-directional mount can have any number of indexed positions.

Figure 22B:
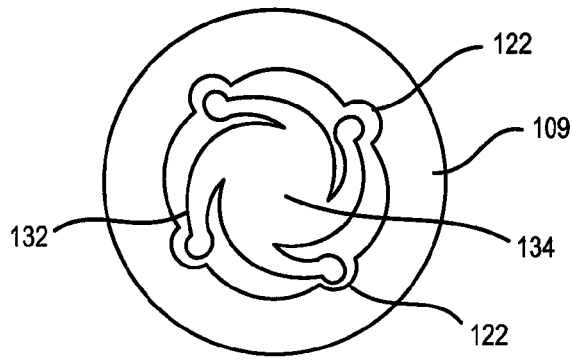

With reference to FIG. 22B, the index member 134 can have a multi-leg spiral configuration. Each of the legs can have a rounded end 132 that can releasably engage indentations 122 in the inner diameter of the body 109. The legs can elastically push the ends 132 outward so that the index member 134 can hold the rotational member in a fixed location when the ends 132 are within the indentations 122. In the illustrated embodiment, the index member 134 has four legs and rounded ends 132 and the body 109 has four indentations 122 for four rotational index positions. However, in other embodiments, the index member 132 can have any number of legs and ends 122 and the body can have any number of recesses 130 so that the multi-directional mount can have any number of stationary positions.

Figure 22C:
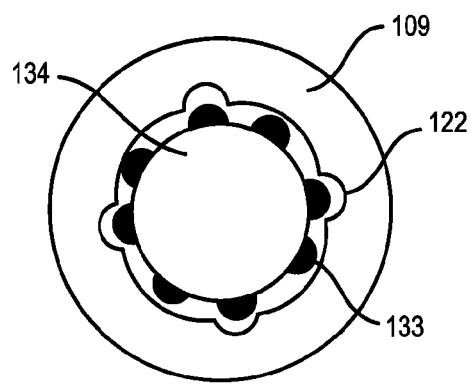

With reference to FIG. 22C, in an embodiment, the outer diameter of the index member 134 has a plurality of rounded protrusions 133 that extend from the outer diameter of the index member 134. The body 109 of the multi-directional mount can have an inner diameter with a plurality of indentations 122. This configuration can be similar to the index member illustrated and described with reference to FIGS. 7-10. However, in an opposite configuration with indentations in the inner diameter of the body 109 and protrusions in the outer diameter of the index member 134. Thus, the component descriptions described above with reference to FIGS. 7-10 can also be applicable to this embodiment.

The construction details of the invention as described and shown in all FIGS., are that the mount 101 can be made of a sufficiently rigid and strong material such as high-strength plastic, metal, and the like. Further, the various components of the internal mechanisms can be made of different materials such as but not limited to: plastics, metals, silicone, rubber, etc. Further yet, the high-impact construction, sealed internal mechanisms and other features make this invention weather and temperature proof to a very wide range of normal environmental conditions. This allows for use in many situations, not limited to land, in water, rain or snow, with no issues.

Figure 17A:
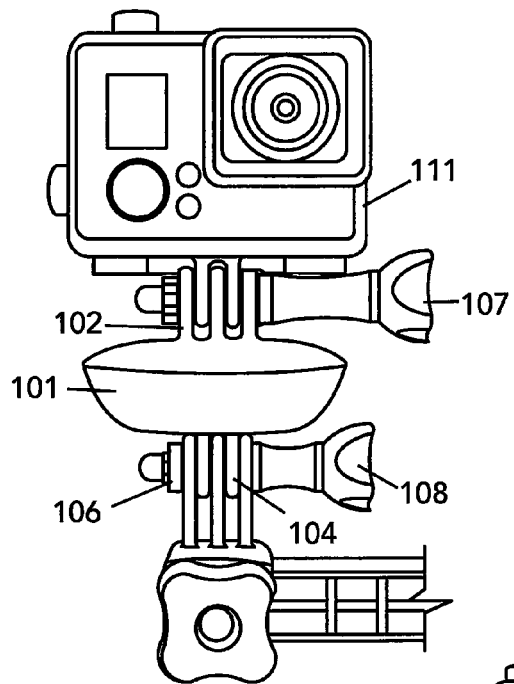
FIGS. 17A-17C are drawings of rotational index mechanisms that can be used with embodiments of multi-directional mounts.
Figure 17B:
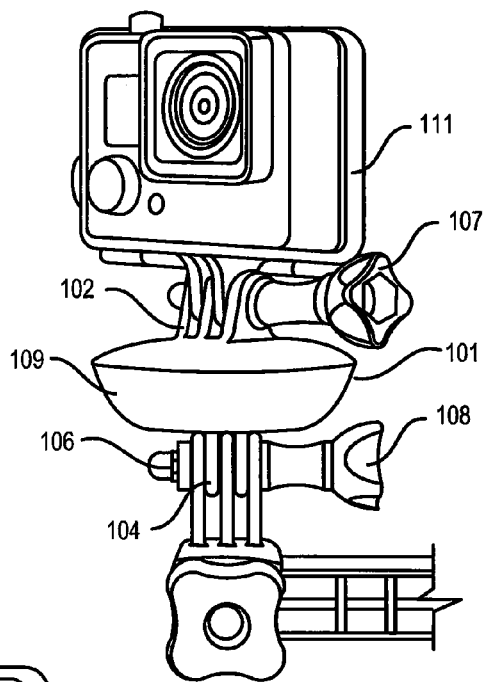
Figure 17C:
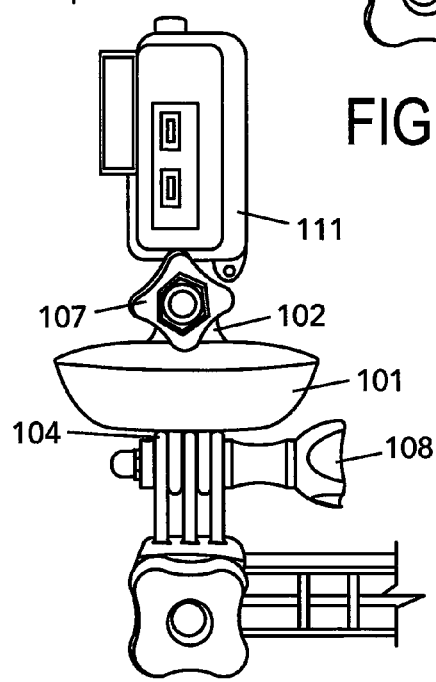

With reference to FIGS. 17A, 17B and 17C, the multidirectional mount is illustrated in three different stationary positions from a front view. In FIG. 17A, the upper tabs 102 and the lower tabs 104 are aligned and the camera 111 is facing straight forward. In FIG. 17B, the upper tabs 102 and the lower tabs 104 are angled at about 45 degrees and the camera 111 is facing to the left relative to its original position. In FIG. 17C, the upper tabs 102 and the lower tabs 104 are angled at about 90 degrees and the camera 111 is facing to the left perpendicular relative to its original position. Each of the illustrated positions can represent indexed positions that the mount 101 can be rotated to that hold the camera 111 steady. More torque is required to rotate the mount 101 from these indexed positions than any rotational movement between the indexed positions.

The rotational member and the body 109 are able to rotate independently in either direction, against each other. This allows the bottom mounting tabs 104 to remain stationary while the top half of the body 109 and a camera 111 attached to the upper tabs 102 are able to rotate clockwise or counterclockwise a full 360 degrees, with predetermined angle positions. Thus, the inventive rotational mount 101 is able to remain stable and allow the camera 111 to be rotated to obtain a different angle of footage, without having to stop filming, and/or reposition the camera 111 by loosening and tightening the thumb knobs 107, 108.

The advantages of the present invention include, without limitation, that it is compact, lightweight, portable and exceedingly easy to transport. It is also easy to incorporate into existing camera mount setups due to the compatible mounting tabs 102, 104. Using other multidirectional devices typically requires two hands, and requires extra effort to adjust extra parts. Further, the included invention is easily interchanged between numerous vehicles, sports and music equipment, rigging, stages, and event spaces While the foregoing written description of the invention enables one of ordinary skill to make and use what is considered presently to be the best mode thereof, those of ordinary skill will understand and appreciate the existence of it's quick, easy, safe usage, it's portability and compatibility of the specific embodiment, method, and examples herein. The invention should therefore not be limited by the above described embodiment, method, and examples, but by all embodiments and methods within the scope and spirit of the invention as claimed.

What is claimed is:

1. A multidirectional mount comprising:
a housing having;
a first plurality of connection tabs rigidly coupled to the housing;
a rotational member having an internal portion within the housing;
an index member coupled to the rotational member wherein the index member includes a circular portion made of an elastic material that includes a plurality of index features; and
a second plurality of connection tabs rigidly coupled to the rotational member extending away from the housing;
wherein the first plurality of connection tabs are axially aligned with a second plurality of connection tabs and the rotational member and the index member rotate axially within the housing and the index member provides a plurality of discrete stops at a plurality of rotational positions.

2. The multidirectional mount of claim 1 wherein the plurality of index features are indentations in the circular portion of the index member.

3. The multidirectional mount of claim 1 wherein the plurality of index features are protrusions extending from the circular portion of the index member.

4. The multidirectional mount of claim 1 wherein the index member engages a plurality of index positions that resist rotation and a plurality of non-index positions as the rotational member rotates relative to the housing.

5. The multidirectional mount of claim 1 further comprising: a seal between the rotational member and the housing; wherein the seal prevents water from entering the housing.

6. A multidirectional mount comprising:
a housing having;
a first plurality of connection tabs rigidly coupled to the housing;
a rotational member having an internal portion within the housing;
an index member coupled to the rotational member wherein the index member includes: a circular ring, a center structure and a plurality of elastic members that extend between the circular ring and the center structure; and
a second plurality of connection tabs rigidly coupled to the rotational member extending away from the housing;
wherein the first plurality of connection tabs are axially aligned with a second plurality of connection tabs and the rotational member and the index member rotate axially within the housing and the index member provides a plurality of discrete stops at a plurality of rotational positions.

7. The multidirectional mount of claim 6 wherein the index member engages a plurality of index positions that resist rotation and a plurality of non-index positions as the rotational member rotates relative to the housing and a portion of the circular ring is deformed inward when the rotational member is in the non-index positions and the circular ring is not deformed inward when the rotational member is in the index positions.

8. The multidirectional mount of claim 6 wherein the center structure of the index member includes a plurality of coupling features that engage the rotational member.

9. The multidirectional mount of claim 8 wherein the coupling features are slots that engage the rotational member.

* * * * *